United States Patent
Sangiovanni et al.

(10) Patent No.: US 11,993,039 B2
(45) Date of Patent: May 28, 2024

(54) PLANT FOR BUILDING GREEN TYRES FOR VEHICLE WHEELS

(71) Applicant: PIRELLI TYRE S.P.A., Milan (IT)

(72) Inventors: Stefano Sangiovanni, Milan (IT); Maurizio Marchini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 286 days.

(21) Appl. No.: 17/225,024

(22) Filed: Apr. 7, 2021

(65) Prior Publication Data
US 2021/0221082 A1    Jul. 22, 2021

Related U.S. Application Data

(62) Division of application No. 15/309,416, filed as application No. PCT/IB2015/054615 on Jun. 19, 2015, now Pat. No. 11,001,020.

(30) Foreign Application Priority Data

Jun. 20, 2014    (IT) ............................ MI2014A001119

(51) Int. Cl.
B29D 30/00    (2006.01)
B29D 30/08    (2006.01)

(52) U.S. Cl.
CPC ........... B29D 30/005 (2013.01); B29D 30/08 (2013.01)

(58) Field of Classification Search
CPC .. B29D 30/0016; B29D 30/005; B29D 30/08; B29D 30/245; B29D 30/2607; B29D 2030/0022; B29D 2030/0055; B29D 2030/206; B29D 2030/482; B60C 15/05; B60C 15/0081

USPC .............................. 156/110.1, 111, 396, 566
See application file for complete search history.

(56) References Cited

U.S. PATENT DOCUMENTS

| | | | | |
|---|---|---|---|---|
| 2,537,632 A | * | 1/1951 | Mansfield | B29D 30/32 152/559 |
| 11,001,020 B2 | | 5/2021 | Sangiovanni et al. | |
| 2003/0170336 A1 | * | 9/2003 | Caretta | B29D 30/005 425/363 |
| 2006/0096695 A1 | * | 5/2006 | Caretta | B29D 30/005 156/111 |
| 2011/0168322 A1 | * | 7/2011 | Mariani | B29D 30/2607 156/111 |
| 2012/0255666 A1 | * | 10/2012 | Mancini | B29D 30/005 425/88 |

(Continued)

FOREIGN PATENT DOCUMENTS

JP    2006297778 A  *  11/2006

OTHER PUBLICATIONS

Ogawa Y, JP-2006297778-A, machine translation. (Year: 2006).*

*Primary Examiner* — Sedef E Paquette
(74) *Attorney, Agent, or Firm* — Steinfl + Bruno LLP

(57) ABSTRACT

A plant for building different models of green tyres for vehicle wheels, including a plurality of workstations using elementary semi-finished products is described. A first carcass structure of a first model of tyre is built on a first forming support, in a first workstation, the first carcass structure including at least one first carcass ply obtained from a first elementary semi-finished product, and at least one first pair of annular reinforcing inserts. The first forming support is delivered to a bypass device to go beyond at least one second workstation without transiting through it.

15 Claims, 2 Drawing Sheets

(56) References Cited

U.S. PATENT DOCUMENTS

2017/0190128 A1    7/2017   Sangiovanni et al.

* cited by examiner

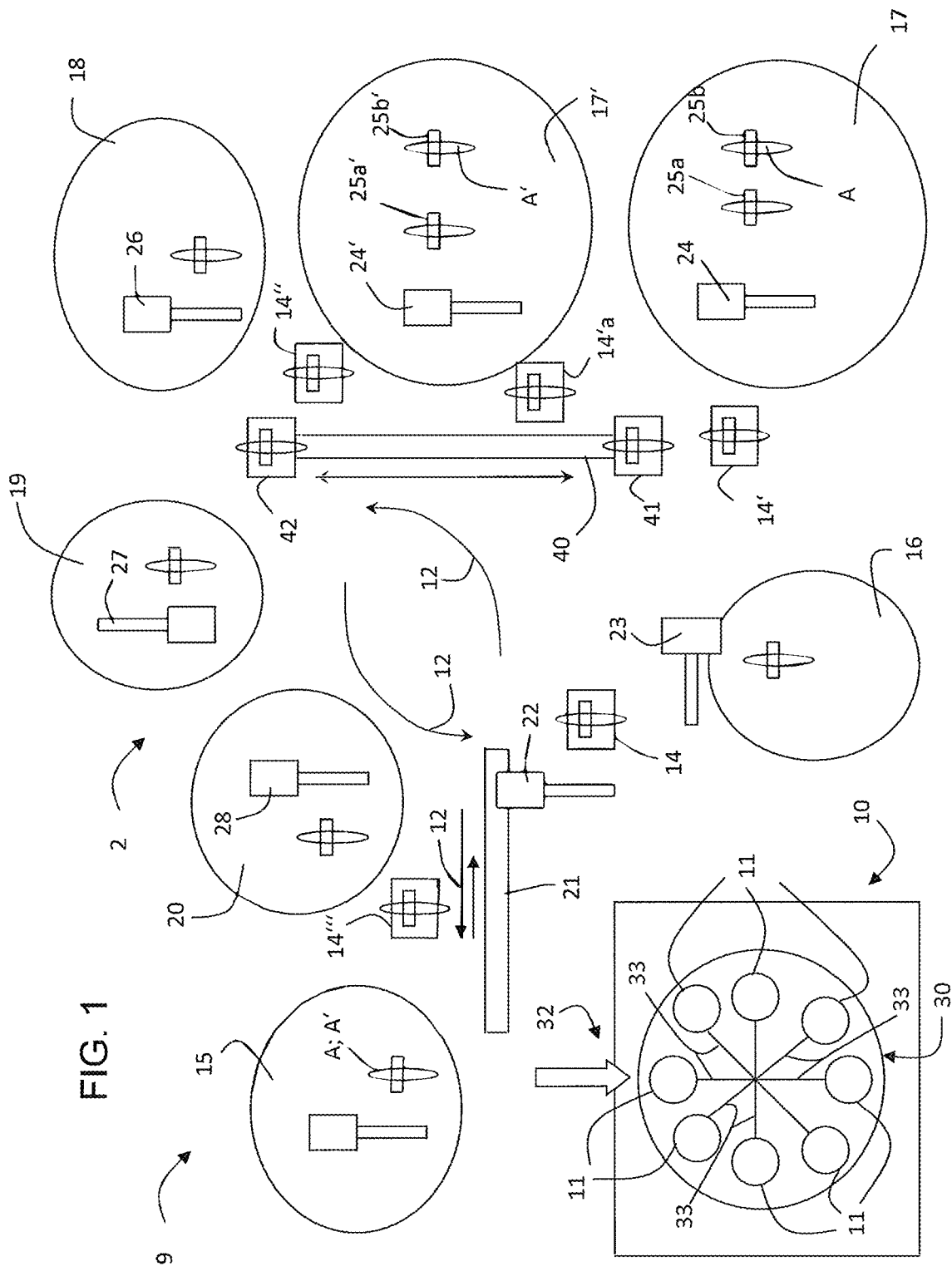

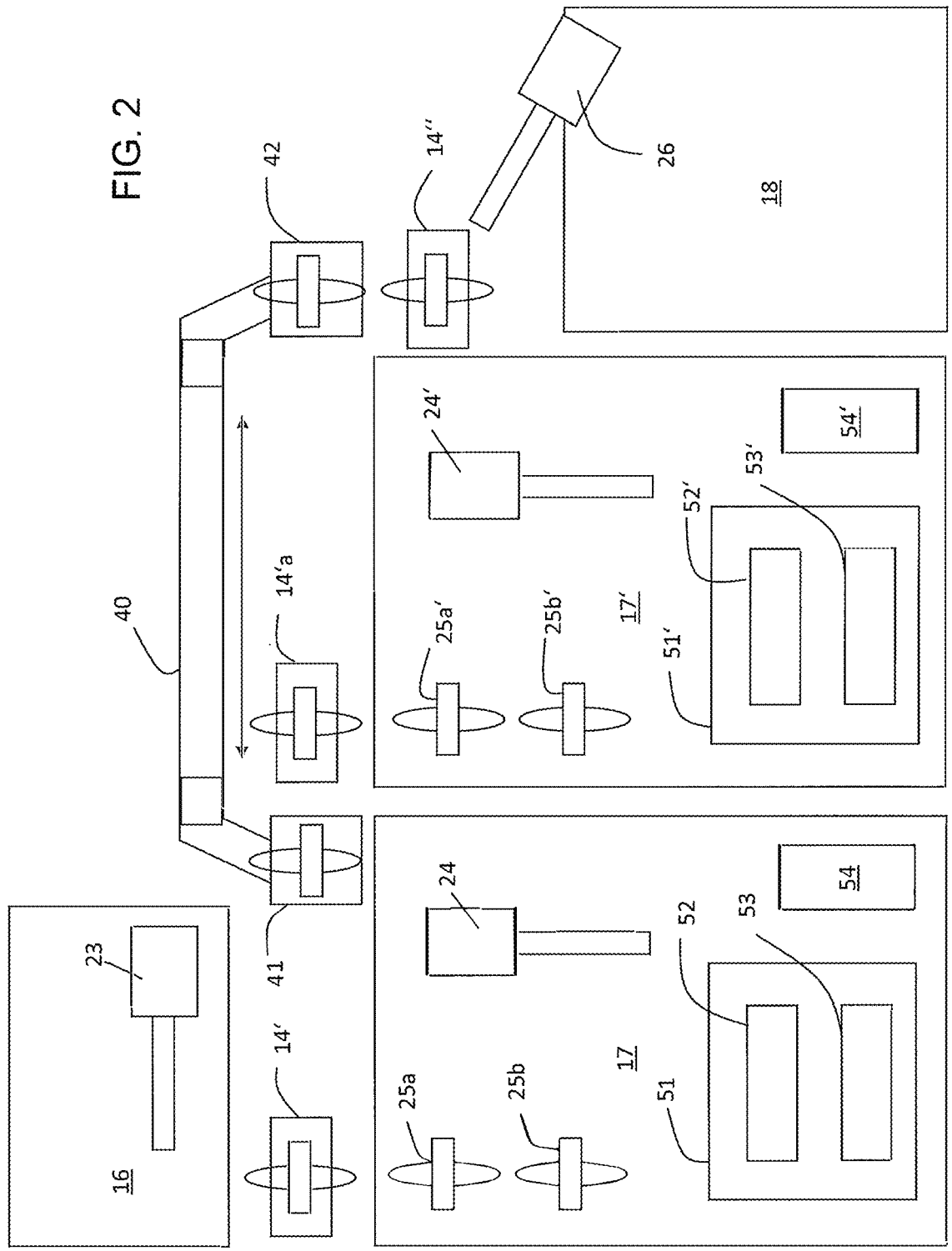

PLANT FOR BUILDING GREEN TYRES FOR VEHICLE WHEELS

CROSS-REFERENCE TO RELATED APPLICATIONS

The present application is a U.S. non-provisional divisional patent application claiming priority to U.S. patent application Ser. No. 15/309,416 filed on Nov. 7, 2016, which, in turn, is a U.S. national stage of International Application PCT/IB2015/054615 filed on Jun. 19, 2015, which, in turn, claims priority to Italian application MI2014A001119 filed on Jun. 20, 2014, the contents of each of which are incorporated herein by reference in their entirety.

SUMMARY OF INVENTION

The present invention relates to a process for building different models of green tyres for vehicle wheels. In particular, the present invention relates to a process for building different models of green tyres by using elementary semi-finished products that are different from each other.

The present invention also relates to a plant for building different models of green tyres for vehicle wheels. Such a plant can be used to carry out the aforementioned building process.

The production cycles of a tyre comprises, after a building process in which the various components of the tyre itself are made and/or assembled in one or more building lines to form a green tyre, a moulding and vulcanization process to be carried out in a suitable vulcanization line, the moulding and vulcanization process being suitable for defining the structure of the tyre according to a desired geometry and tread pattern.

A tyre generally comprises a toroidally ring-shaped carcass structure including one or more carcass plies, strengthened with reinforcing cords lying in substantially radial planes (a radial plane contains the rotation axis of the tyre). The ends of each carcass ply are fixedly associated with at least one metal annular reinforcing structure, known as bead core, which constitutes the reinforcement at the beads, i.e. at the radially inner ends of the tyre, having the function of allowing the assembly of the tyre with a corresponding mounting rim. A band of elastomeric material, called tread band, is arranged in a radially outer position with respect to the carcass structure, at the end of the moulding and vulcanization steps, a pattern in relief is formed in the same for the contact with the ground. A reinforcing structure, generally known as belt structure, is arranged between the carcass structure and the tread band. Such a structure usually comprises, in the case of tyres for automobile, at least two radially overlapping strips made of rubber fabrics provided with reinforcing cords, usually metallic, arranged parallel to each other in each strip and crossing over with the cords of the adjacent strip, preferably symmetrically with respect to the axial mid-plane of the tyre. Preferably, the belt structure also comprises, in a radially outer position thereof, at least on the ends of the underlying belt strips, also a third layer of textile or metallic cords, arranged circumferentially (at 0 degrees).

Respective sidewalls made of elastomeric material are also applied in an axially outer position on the side surfaces of the carcass structure. Such sidewalls extend each from one of the side edges of the tread band up to the respective annular reinforcing structure at the beads.

Finally, in tubeless tyres, a radially inner layer, called liner, is provided, such an inner layer having characteristics of impermeability to ensure the airtight seal of the tyre itself.

The term "elastomeric material" indicates a composition comprising at least one elastomeric polymer and at least one reinforcing filler. Preferably, such a composition also comprises additives such as cross-linking agents and/or plasticizers. Due to the presence of the cross-linking agents, such a material can be cross-linked through heating, so as to form the end product.

The term "green tyre" indicates a tyre obtained from the building process and not yet vulcanized.

The term "elementary semi-finished products" indicates continuous elongated elements made of elastomeric material. Preferably, the aforementioned continuous elongated elements have at least one textile or metallic reinforcing cord inside them. Even more preferably, the aforementioned continuous elongated elements are cut to size so as to form strips of elastomeric material generally called "strip-like elements". Generally, such semi-finished products are arranged close to one another, particularly in the case of strip-like elements that are used for example for making carcass plies, belt strips and some types of reinforcements. Preferably, such a close arrangement occurs side-by-side at the longest side of the strip-like element. Preferably, such close arrangement occurs on a substantially cylindrical, and/or substantially toroidal, and/or substantially flat, deposition surface.

The term "technological flexibility" indicates the possibility of using, for each tyre, elementary semi-finished products that differ from one other for the type of elastomeric material or the type of textile or metal reinforcing cord.

The term "productive flexibility" indicates the possibility of making up for possible temporarily unavailability of production resources, in a building process.

The term "structural component" of the tyre indicates any component suitably for performing a function in the tyre, or a portion thereof. Such a structural component is selected, for example, among: liner, under-liner, carcass ply(-ies), under-belt insert, belt strips either crossed, or of the zero degrees type, attachment sheet for the tread band, tread band, bead core, bead filler, reinforcing inserts made from textile, metallic or only elastomeric material, anti-abrasion insert, sidewall inserts.

The term "size" of the tyre indicates the whole of the geometric characteristics that characterise a tyre, i.e. at least width of the tread band, height of the sidewalls, fitting diameter.

The term "model" of tyre o indicates the whole of the structural characteristics (like for example single or two-ply structure, radial or with crossed carcass plies, with or without belt structure, type of belt structure—crossed belts, zero degrees belts, both crossed and zero degrees belts, type of tread band with one or more layers, etc.), and technological characteristics (like for example compound of the various structural components, materials of the textile or metallic reinforcing cords, type of formation of the reinforcing cords, etc.).

The term "cycle time" of a plant for building tyres indicates the time period that at normal operating speed passes between the completion of the building of one green tyre and the completion of the building of a subsequent green tyre.

In some processes for manufacturing tyres developed up to now, the tyres are produced from a limited number of elementary semi-finished products fed on a toroidal support.

The toroidal support is moved, preferably through a robotic system, among a plurality of workstations in each of which a particular building step of the tyre is carried out, through automated sequences.

International patent application WO 2008/043382, to the same Applicant, describes a tyre building line on which each tyre being processed is manufactured by assembling structural components thereof in a predetermined sequence. The building line is provided with workstations arranged one after the other along a production path, each intended to produce and assemble a structural component of the tyre being processed. In particular, to build a two-ply carcass structure two workstations are used, each of which comprises a carcass structure assembly apparatus fed with an elementary semi-finished product and a filling insert application device. In operation, a toroidal forming support is fed into a first workstation for making a first carcass ply and depositing a first pair of bead cores at the assembly apparatus and for depositing respective filling inserts at the aforementioned application device. Thereafter, the toroidal forming support is fed into a second workstation for making a second carcass ply and depositing a further pair of bead cores at the respective assembly apparatus and for depositing respective filling inserts at the respective application device.

International patent application WO 2011/077236, to the same Applicant, illustrates a tyre building line provided with workstations, each intended to produce and assemble a structural component of the tyre being processed, and in which in order to build the carcass structure and/or the crown structure a plurality of feeding units of elementary semi-finished products that are different from each other is provided.

The Applicant has verified that the building lines of the type described in WO 2008/043382 offer low technological flexibility, at most allowing tyres of different size to be built, but not of different model.

In detail, the Applicant has observed that the assembly apparatuses of the workstations specifically provided for making the carcass structures are associated with a same type of elementary semi-finished product. This is due to the fact that, in two-ply carcass structures of a certain model of tyre, the respective carcass plies are typically made from the same elementary semi-finished product.

The Applicant has noted that in order to pass from building a tyre of a first model to a tyre of a second model, which differs from the first at least for the type of semi-finished product from which the respective carcass plies are made, it is necessary to wait for the completion of the carcass structure of the first model of tyre, in order to then be able to "convert" the relative workstations so as to make them suitable for making the carcass structure of the second model of tyre. Specifically, the conversion of the workstations consists, at least, of arranging the respective assembly apparatuses for the use of a different semi-finished product, suitable for making the carcass plies of the second model of tyre.

The Applicant has therefore realised that, in processes of the type described above, once the building of tyres with certain elementary semi-finished products has started, it is necessary to interrupt production in order to modify the selected semi-finished products, with consequent production drawbacks.

The Applicant has also verified that tyre building lines of the type indicated above also offer a low production flexibility, since, in the case of failure of a workstation or of unavailability of a relative transportation device—i.e. a device that operates on the building line to transfer each of the tyres being processed in sequence from one workstation to the next one—it may be necessary to interrupt the production.

The Applicant has indeed observed that, in building lines provided for using the workstations in succession, it is often necessary to pass through each of the workstations to complete the building of a tyre.

The Applicant has therefore realized that, in such building lines, the failure of a workstation or of the transportation device associated with it can make it impossible to complete the building of a tyre.

The Applicant has therefore felt the need to improve the productivity of the lines for building green tyres in particular, in terms of both technological and operative flexibility.

The Applicant has finally found that providing a process for building green tyres wherein it is used, in a plant for building tyres, an elementary semi-finished product that is different for each of the workstations specifically provided for making the carcass structures, making each carcass structure entirely in a respective workstation, at least in part simultaneously with at least one different carcass structure made in a different workstation, and wherein it is used a by-pass device that allows the leaving of the tyres being processed from said workstations to be made independent, leads to substantial advantages in terms of technological and operative flexibility.

The present invention therefore relates, in a first aspect thereof, to a process for building different models of green tyres for vehicle wheels, by using elementary semi-finished products, in a building plant comprising a plurality of workstations.

Preferably, a first carcass structure of a first model of tyre is built on a first forming support in a first workstation.

Preferably, the first carcass structure comprises at least one first carcass ply obtained from a first elementary semi-finished product, and at least one first pair of annular reinforcing inserts.

Preferably, at least one second carcass structure of at least one second model of tyre different from said first model of tyre is built on at least one second forming support, in at least one second workstation.

Preferably, the at least one second carcass structure comprises at least one first carcass ply obtained from at least one second elementary semi-finished product different from the first elementary semi-finished product and at least one second pair of annular reinforcing inserts.

Preferably, the building of the first carcass structure and the building of the at least one second carcass structure are carried out at least in part simultaneously with each other.

Preferably, at the end of the building of the first carcass structure, the first forming support is transferred from the first workstation to a workstation arranged beyond the second workstation, for building at least one further structural component of the first model of tyre.

Preferably, the aforementioned transfer takes place by delivering the first forming support to a by-pass device to go beyond the at least one second workstation without transiting through it.

The Applicant believes that such a process makes it possible to have the at least two workstations working independently from each other, thus being able to possibly build two different types of green tyres in parallel, without having to wait for the end of the building of the carcass structure of a first model of tyre (by interrupting the production), before being able to move on to the building the carcass structure of the second model of tyre.

The Applicant thus believes that the process described above makes it possible to obtain the desired technological and operative flexibility due to the fact that it is possible to build in parallel the carcass structures of at least two different green tyres and to the possibility of completing each of the aforementioned carcass structures in a single workstation.

The Applicant finally believes that in the case of failure of one of the at least two workstations specifically provided for making the carcass structure it is still possible to complete the building of the tyre, since the carcass structure can be entirely made in just one of the two workstations to then be subsequently transferred thus continuing the building of the respective green tyre being processed. Indeed, the first workstation is completely independent from the second workstation, also regarding the transfer of a tyre being processed, for which the carcass structure has been completed, downstream of said first and second workstations.

In a second aspect thereof, the invention relates to a plant for building different models of green tyres for vehicle wheels by using elementary semi-finished products.

Preferably, at least one first workstation is provided for building a first carcass structure on a first forming support.

Preferably, said first workstation comprises a first assembly apparatus configured for assembling the first carcass structure.

Preferably, the first assembly apparatus comprises a first feeding unit configured for feeding a first elementary semi-finished product onto the first forming support.

Preferably, at least one second workstation is provided for building at least one second carcass structure on at least one second forming support.

Preferably, the at least one second workstation comprises at least one second assembly apparatus configured for assembling the at least one second carcass structure.

Preferably, the at least one second assembly apparatus comprises at least one second feeding unit configured for feeding a second elementary semi-finished product, different from the first elementary semi-finished product, onto the at least one second forming support.

Preferably, at least one by-pass device is provided for transporting the first forming support from the first workstation to a workstation arranged beyond the second workstation for building at least one further structural component, without transiting through the second workstation.

Preferably, the first workstation and the second workstation are synchronised with each other so that the first carcass structure and the second carcass structure are built at least in part simultaneously.

The present invention, in at least one of the aforementioned aspects, can have at least one of the following preferred characteristics.

Preferably, building a first carcass structure comprises, in sequence:
bringing the first forming support to a first carcass structure assembly apparatus provided in the first workstation;
building on the first forming support the at least one first carcass ply obtained from the first elementary semi-finished product and the at least one first pair of annular reinforcing inserts so as to associate each annular reinforcing insert with a respective edge of the at least one first carcass ply obtained from the first elementary semi-finished product;
transferring the first forming support to a first filling insert application device provided in the first workstation;
applying a filling insert on the at least one first carcass ply obtained from the first elementary semi-finished product.

Preferably, building at least one second carcass structure comprises, in sequence:
bringing the at least one second forming support to at least one second carcass structure assembly apparatus provided in the at least one second workstation;
building on the at least one second forming support the at least one first carcass ply obtained from the at least one second elementary semi-finished product and from the at least one second pair of annular reinforcing inserts so as to associate each annular reinforcing insert with a respective edge of the at least one first carcass ply obtained from the at least one second elementary semi-finished product;
transferring the at least one second forming support to a second filling insert application device provided in the at least one second workstation;
applying a filling insert on the at least one first carcass ply obtained from the at least one second elementary semi-finished product.

More preferably, building a first carcass structure comprises, after applying the filling insert on the at least one first carcass ply obtained from the first elementary semi-finished product:
bringing the first forming support to the first carcass structure assembly apparatus;
building on the at least one first carcass ply obtained from the first elementary semi-finished product a further carcass ply obtained from the first elementary semi-finished product.

More preferably, building at least one second carcass structure comprises, after applying the filling insert on the at least one first carcass ply obtained from the at least one second elementary semi-finished product:
bringing the at least one second forming support back to the at least one second carcass structure assembly apparatus;
building on the at least one first carcass ply obtained from the at least one second elementary semi-finished product a further carcass ply obtained from the at least one second elementary semi-finished product.

Even more preferably, building a first carcass structure obtained from the first semi-finished product comprises, after building the further carcass ply obtained from the first elementary semi-finished product:
building a third pair of annular reinforcing inserts so as to associate each annular reinforcing insert of the third pair of annular reinforcing inserts with a respective radially inner edge of the further carcass ply obtained from the first elementary semi-finished product.

Even more preferably, building at least one second carcass structure comprises, after building the further carcass ply obtained from the at least one second elementary semi-finished product:
building a fourth pair of annular reinforcing inserts so as to associate each annular reinforcing insert of the fourth pair of annular reinforcing inserts with a respective radially inner edge of the further carcass ply obtained from the at least one second elementary semi-finished product.

Preferably, after building the third pair of annular reinforcing inserts it is foreseen to:
transfer the first forming support to the first filling insert application device;

apply a filling insert on the further carcass ply obtained from the first elementary semi-finished product.

Preferably, after building the fourth pair of annular reinforcing inserts it is foreseen to:

transfer the at least one second forming support to the at least one second filling insert application device;

apply a filling insert on the further carcass ply obtained from the at least one second elementary semi-finished product.

Preferably, at the end of building the at least one second carcass structure, the at least one second forming support is transferred to the workstation for building at least one further structural component of said at least one second model of tyre.

Preferably the at least one further structural component of the first model of tyre or of the second model of tyre comprises a belt structure.

Preferably, prior to building the first carcass structure and the at least one second carcass structure in the first workstation and in the at least one second workstation, respectively, the first forming support or the at least one second forming support is transferred to the first workstation or to the at least one second workstation depending on whether the green tyre to be built is of the first model or of the at least one second model, respectively.

Preferably, the first forming support and the at least one second forming support are moved within the first workstation and within the at least one second workstation through respective transportation devices.

Preferably, the first elementary semi-finished product and the second elementary semi-finished product are strip-like elements.

Preferably, the at least one first carcass ply and further carcass ply obtained from the first elementary semi-finished product, and the at least one second carcass ply and further carcass ply obtained from the at least one second elementary semi-finished product are built through side-by-side deposition of a plurality of strip-like elements adjacent to each other at the longer side thereof.

Preferably, the aforementioned plant has a predetermined cycle time and the actions of building the first carcass structure and the at least one second carcass structure are simultaneous for a time comprised between about 60% and about 140% of the aforementioned cycle time.

Preferably, the first workstation further comprises:

a first transportation device configured for transporting the first forming support towards to and away from the first assembly apparatus.

More preferably, the first workstation further comprises:

a first application unit configured for applying annular reinforcing inserts on the first forming support.

Even more preferably, the first workstation further comprises:

a first filling insert application device configured for applying the first filling insert on the first forming support.

Preferably, the at least one second workstation further comprises:

at least one second transportation device configured for transporting the at least one second forming support towards to and away from the at least one second assembly apparatus.

More preferably, the at least one second workstation further comprises:

at least one second application unit configured for applying annular reinforcing inserts on the at least one second forming support.

Even more preferably, the at least one second workstation further comprises:

at least one second filling insert application device configured for applying at least one second filling insert on the at least one second forming support.

Preferably, the workstation arranged beyond the second workstation is configured to build, on each of the first carcass structure and at least one second carcass structure, a belt structure of a respective model of tyre.

More preferably, the by-pass device is a translator carriage.

Alternatively, the by-pass device is an anthropomorphic robotic arm.

The provision of a by-pass device of the second workstation allows the tyre being processed in the first workstation to be transferred to the workstations arranged downstream of the second workstation in a totally independent manner from the second workstation, thus increasing the overall operative flexibility of the plant.

Preferably, the first workstation comprises at least one first waiting unit for temporarily storing the first forming support.

Preferably, the first workstation comprises two first waiting units.

In this way, it is possible to manage the processing partially in parallel of many tyres in the first workstation.

The provision of many waiting units in the first workstation allows many forming supports to stop simultaneously in such a workstation for building respective carcass structures.

Preferably, a further waiting unit is arranged upstream of the first workstation.

The provision of such a further waiting unit makes it possible to increase the number of tyres being processed in the first workstation.

Preferably, the at least one second workstation comprises at least one second waiting unit for temporarily storing the at least one second forming support.

Preferably, the at least one second workstation comprises two second waiting units.

The provision of many waiting units in the at least one second workstation allows many forming supports to stop simultaneously in such a workstation for building respective carcass structures of a different model from those being built in the first workstation.

Preferably, at least one further waiting unit is arranged upstream of the at least one second workstation.

Similarly to what has been said in relation to the first workstation, the provision of such a further waiting unit makes it possible to increase the number of tyres being processed in the at least one second workstation.

Preferably, the first and/or the at least one second transportation device comprise respective anthropomorphic robotic arms.

Preferably, the first forming support and the at least one second forming support are toroidal in shape.

Preferably, the first forming support and the at least one second forming support have a respective radially outer surface having a profile which substantially coincides with the profile of the radially inner surface of the tyre that it is wished to build on that toroidal support.

Preferably, there is a further transportation device configured for transporting the first forming support and at least one second forming support towards the first workstation and towards the at least one second workstation, respectively.

Said further transportation device feeds the forming supports selectively to the first workstation or to the at least one second workstation depending on the model of tyre that it is wished to build.

Preferably, there is at least one waiting unit configured for receiving the second forming support carrying the second carcass structure from a transportation device of the second workstation and for allowing the transportation of the second forming support towards the workstation arranged beyond the second workstation through a transportation device associated therewith.

Preferably, the first assembly apparatus and the at least one second assembly apparatus build, through the first feeding unit and the at least one second feeding unit, respectively, each carcass ply belonging to the first carcass structure and to the at least one second carcass structure, respectively, by arranging close to each other side-by-side a plurality of axially adjacent strip-like elements at the longer side thereof, respectively.

BRIEF DESCRIPTION OF DRAWINGS

Further characteristics and advantages of the present invention will become clearer from the following detailed description of preferred embodiments thereof, made with reference to the attached drawings.

In such drawings:

FIG. 1 shows a schematic lay-out of an embodiment of a plant for building different models of green tyres for vehicle wheels in which the process according to the present invention is carried out; and FIG. 2 shows a more detailed portion of the plant of FIG. 1.

DETAILED DESCRIPTION

In FIG. 1, reference numeral 9 wholly indicates an embodiment of a plant in which the process for building different models of green tyres for vehicle wheels according to the present invention is carried out.

The plant 9 essentially comprises a building line 2 on which each tyre being processed is manufactured by assembling structural components of the same tyre in a predetermined sequence, and a vulcanization line 10 on which each green tyre coming from the building line 2 is moulded and vulcanized in a respective mould 11.

In the building line 2 the various structural components of the tyre are made and/or assembled in a plurality of workstations 16, 17, 17', 18, 19, 20 arranged one after the other along a production path, preferably shaped like a closed ring and shown in the drawing, just as an indication, by the arrows 12, in order to build a green tyre.

The workstations 16, 17, 17', 18, 19, 20 are provided to work at least in part simultaneously, each on at least one tyre being processed on a respective forming support to build at least one structural component thereof on the forming support.

In greater detail, the different structural components used in the building of each tyre are advantageously engaged on a forming support, preferably toroidal in shape. More preferably, said toroidal shape of the forming support has a shape such as to substantially match the internal shape of the tyre to be obtained. This forming support is preferably of the collapsible tyre or it is intended to be divided into a plurality of sectors, so as to be able to be easily removed from the tyre at the end of the moulding and vulcanization step.

In the example shown in FIG. 1, various tyres are built at least in part simultaneously on respective forming supports A, A'. The tyres built on the forming supports A, A' are of a different model from each other.

Transportation devices 23, 24, 24', 26, 27, 28 operates on the building line 2 to sequentially transfer each of the tyres being processed on the forming supports A, A' from one workstation 16, 17, 17', 18, 19, 20 to the next workstation, so as to have a sequential building of all of the structural components of the green tyre and finally transfer the latter to the vulcanization line 10.

Preferably, the transportation devices 23, 24, 24', 26, 27, 28 comprise one or more anthropomorphic robotic arms each of which is associated with at least one of the workstations 16, 17, 17', 18, 19, 20 and is configured to operate on a respective forming support A, A' to carry out the sequential transfer of each tyre being processed, as will be explained more clearly hereafter.

Moreover, in the embodiment illustrated herein, there is a further transportation device 22, specifically a robotic arm, which can move along a guide structure 21 and operates between the building line 2 and the vulcanization line 10 to pick up a finished tyre from the vulcanization line 10 and transfer it to a service station 15, where the vulcanized tyre is removed from the respective forming support by disassembling such a support. In the service station 15, the forming support is subsequently reassembled to then be transferred, again through the robotic arm 22, to a waiting unit 14 from which it will be picked up for a subsequent use in the building of a new tyre.

A robotic arm 23 carries out the transfer of the forming support from the waiting unit 14 to a workstation 16 where the assembly of the first component is carried out for building the tyre. Such a preliminary assembly operation can, for example, comprises the coating of the outer surface of the forming support with an airtight thin layer of elastomeric material, usually called "liner", as well as the application of optional elastomeric compounds close to the regions corresponding to the beads of the tyre and/or a further coating layer of elastomeric material, arranged on the top of the liner.

Preferably, each workstation 16, 17, 17', 18, 19, 20 is provided with at least one respective feeding unit configured to feed a specific elementary semi-finished product onto the forming support for making the corresponding structural component and operating in combination with application devices configured for applying the elementary semi-finished product and/or the structural components obtained.

When the assembly of the components in the workstation 16 has been completed, the second robotic arm 23 deposits the forming support with the respective tyre being processed in one of two further waiting units 14', 14'a.

The waiting units 14', 14'a are each associated with a respective workstation 17, 17' for building a respective carcass structure of a respective model of tyre. Each workstation 17, 17' is associated with a respective robotic arm 24, 24'.

Preferably, the waiting units 14', 14'a are arranged upstream of the respective workstations 17, 17'.

Workstation 17 is arranged upstream of the workstation 17' in the production path 12.

The robotic arms 24, 24' simultaneously or in succession pick up the forming supports from the respective waiting units 14', 14'a to transfer them to the workstation 17 or to the workstation 17', respectively.

When the first carcass structure has been completed in the workstation 17, the robotic arm 24 places the forming support with the respective tyre being processed at a first transfer position 41.

A by-pass device 40 picks up the forming support from the first transfer position 41 to transport it to a second transfer position 42 arranged close to a workstation 18 for building a belt structure. The workstation 18 is arranged downstream of the workstation 17'. The transfer of the forming support from the workstation 17 to the workstation 18 thus takes place without transiting through the workstation 17'.

Preferably, the by-pass device is a translator carriage or alternatively an anthropomorphic robotic arm.

When the carcass structure built in the workstation 17' is completed, the robotic arm 24' places the forming support on which the aforementioned carcass structure was formed in a waiting unit 14". Also the waiting unit 14" is placed close to the aforementioned workstation 18.

A robotic arm 26 picks up the forming support which is in the waiting unit 14" or the forming support which is in the transfer unit 42 to bring it to the workstation 18 for the building of a belt structure.

When the building of the belt structure has been completed, the robotic arm 26 transfers the forming support on which the aforementioned belt structure has been formed to a workstation 19 for the application of a tread band.

In the workstation 19 the forming support carrying the tyre being processed is engaged by a robotic arm 27 with the help of which the application of the tread band is carried out. Specifically, the tread band is obtained by winding a continuous elongated element of elastomeric material in coils arranged consecutively side by side and/or at least partially overlapping until a tread band is obtained having the desired thickness and shape.

Preferably, the tyre is subsequently transferred to a workstation 20 for the application of anti-abrasion elements and sidewalls. In the workstation 20 the forming support is engaged by a robotic arm 28 that causes a suitable movement thereof in front of the respective work apparatuses to carry out the application of abrasion resistant elements in regions corresponding to the beads, as well as the application of the sidewalls, which are preferably obtained by winding a continuous elongated element of elastomeric material to form coils arranged side by side and/or at least partially overlapping.

When this operation has ended, the robotic arm 28 places the built green tyre in an end waiting unit 14''', before transferring the tyre itself to the vulcanization line 10.

The vulcanization line 10 advantageously comprises at least one series of vulcanization moulds 11 that are mounted on a turntable 30 which can be set in rotation through a stepped movement so as to allow the moulds to carry out a closed loop path, along the vulcanization line 10, bringing them in sequence, one after the other, to a loading-unloading station 32 of the tyres being processed. Each vulcanization mould 11 is supported by a respective arm 33 of the turntable 30.

With reference to FIG. 2, the workstation 17 for building a first carcass structure comprises a first assembly apparatus 51 configured to assemble at least one portion of a first carcass structure of the tyre to be built, for example through the deposition of a plurality of band-like elements on side and crown portions of the forming support A, to form a carcass ply.

The first assembly apparatus 51 is provided with a first feeding unit 52 configured to feed a first elementary semi-finished product, preferably in the form of band-like elements, such as strip-like elements.

Preferably, the first assembly apparatus 51 builds the carcass ply by bringing together a plurality of first strip-like elements axially adjacent to one another at the longer side of the strip-like elements, the first strip-like elements being obtained by cutting to size the first elementary semi-finished product that preferably is in the form of a continuous elongated element reinforced with textile or metal cords.

Similarly, the second workstation 17' for building a second carcass structure comprises a second assembly apparatus 51' configured to assemble at least one portion of a second carcass structure of the tyre to be built, for example through the deposition of a plurality of band-like elements on side and crown portions of the forming support A', to form a carcass ply.

The second assembly apparatus 51' is provided with a second feeding unit 52' configured to feed a second elementary semi-finished product, preferably in the form of band-like elements such as strip-like elements.

Preferably, also the second assembly apparatus 51' builds the carcass ply by bringing together a plurality of second strip-like elements axially adjacent to one another for the longer side of the strip-like elements, the second strip-like elements being obtained by cutting to size the second elementary semi-finished product, also preferably in the form of a continuous elongated element reinforced with textile or metal cords.

In particular, the second elementary semi-finished product differs from the first elementary semi-finished product, for example for the elastomeric material used to make the elementary semi-finished product, for the type of reinforcing elements inside the elastomeric material and so on.

In this way, it is possible to build in the two workstations 17, 17' carcass structures that are different from each other in order to make different models of green tyres.

A carcass structure is entirely built in the same workstation 17, 17'. In particular, in the case of two-ply carcass structure, both of the carcass plies made from the same elementary semi-finished product are assembled in the same workstation 17, 17'.

Each assembly apparatus 51, 51' preferably further comprises an application unit configured for applying annular reinforcing inserts 53, 53' intended to form an annular reinforcing insert through the deposition of a plurality of coils of a first element, preferably in the form of a rubber-coated metal wire, on at least one radially inner portion of the respective forming support A, A'.

Preferably, each of the first and the second workstation 17, 17' further comprises at least one second filling insert application device 54, 54' configured to place a plurality of coils of a second element, preferably in the form of a continuous elongated element made of elastomeric material, on at least one radially inner portion of the respective forming support being processed, so as to form a filling insert structure.

The workstations 17, 17' are synchronised with each other so that the first carcass structure and the second carcass structure are built at least in part simultaneously.

Each of the workstations 17, 17' shown in FIG. 2 comprises two inner waiting units 25a, 25b and 25a', 25b' for temporarily storing a forming support carrying a tyre being processed.

A preferred embodiment of a process for building different models of green tyres for vehicle wheels according to the invention will now be described more in detail.

After the possible first components of the tyre have been assembled in the workstation 16, the forming support carrying the tyre being processed is transferred to the first workstation 17 or to the second workstation 17' for building a first or a second carcass structure, respectively, depending on whether the green tyre to be built is of a first model or of a second model, respectively.

In the specific example shown in FIG. 1, the transfer of the forming support carrying the tyre being processed out from the workstation 16 takes place through the deposition, by the robotic arm 23, of the forming support in the respective waiting unit 14' or in the waiting unit 14'a arranged upstream of the first workstation 17 and of the second workstation 17', respectively, for building a respective carcass structure.

From such waiting units 14', 14'a, the robotic arm 24, 24' picks up the forming support to start the building of the respective carcass structure in the workstation 17 (in the specific example illustrated here, on the forming support A) or in the workstation 17' (in the specific example illustrated here, on the forming support A').

In particular, a first carcass structure of a first model of tyre is built on the forming support A in the first respective workstation 17.

The first carcass structure comprises at least one first carcass ply obtained from the first elementary semi-finished product fed to the first workstation 17, and at least one first pair of annular reinforcing inserts.

At least partially in parallel, the process according to the present invention comprises building on the forming support A' a carcass structure of a second model of tyre, different from the first model, in the second respective workstation 17'.

The second carcass structure comprises at least one first carcass ply obtained from the second elementary semi-finished product fed to the second workstation 17' and different from the first elementary semi-finished product, and at least one second pair of annular reinforcing inserts.

The actions of building the carcass structure of the first model of tyre and the carcass structure of the second model of tyre are therefore carried out at least in part simultaneously.

As specified earlier, the cycle time of a plant for building tyres here is the time period that at normal operating speed passes between the completion of the building of one green tyre and the completion of the building of a subsequent green tyre. In particular, in the case of a plant for building green tyres in which the operations are carried out sequentially, like the plant 9 of FIG. 1, the cycle time is generally determined by the building operation having the longest work cycle, in this specific case by the operation of building a single carcass ply.

Therefore, the first workstation 17 and the second workstation 17', in which even two-ply carcass structures are entirely made, can have a work cycle that can last up to about 300% of the cycle time of the plant 9 (because of the building operations of the annular reinforcing inserts and of the filling inserts).

At normal operating speed, considering the time for the forming supports A and A' going in and out the respective workstations 17 and 17', since the cycle time substantially coincides with the building of a single carcass ply (so that for example the first model of tyre being processed on the forming support A substantially ends the building of the first carcass ply when the second model of tyre being processed on the forming support A' enters into the station 17') the actions for the building of the carcass structures on the forming supports A, A' will be simultaneous preferably for a time comprised between about 60% and about 140% of the cycle time of the plant, because of the differences that can exist between different models of different size.

Even more preferably, such actions are carried out simultaneously for a time comprised between about 80% and about 120% of the cycle time of the plant.

In the specific case of building two-ply models, each of the actions for the building of the first and second carcass structure comprises a first step of transferring the forming support A, A' carrying the tyre being processed to the respective carcass structure assembly apparatus 51, 51' provided in the relative workstation 17, 17'.

In such an assembly apparatus 51, 51' it is carried out the building, on the forming support, A, A' of a first carcass ply obtained from the corresponding elementary semi-finished product and of the respective first or second pair of annular reinforcing inserts so as to associate each annular reinforcing insert with a respective edge of the first carcass ply.

Thereafter, the forming support A, A' is transferred by the robotic arm 24, 24' to the filling insert application device 54, 54' provided in the corresponding workstation 17, 17', where the application of a filling insert on the first carcass ply previously obtained takes place.

The building of the first and second carcass structure preferably also comprise, after the application of the filling insert on the first carcass ply, bringing the forming support A, A' back to the respective carcass structure assembly apparatus 51, 51' through the robotic arm 24,24' for the building on the first carcass ply obtained from the respective elementary semi-finished product of a further carcass ply obtained from the same elementary semi-finished product.

Thereafter, a further pair of annular reinforcing inserts is preferably built so as to associate each annular reinforcing insert of such a further pair with a respective radially inner edge of the further carcass ply obtained from the respective elementary semi-finished product.

Finally, the forming support A, A' is preferably brought by the robotic arm 24, 24' back to the respective filling insert application device 54, 54' so as to apply a filling insert on the further carcass ply obtained from the respective elementary semi-finished product.

The management of the passages between the assembly apparatus 51, 51' and the filling insert application device 54, 54' of the same workstation 17, 17' is supported by the use of the inner waiting units 25a,25b, 25a',25b' that make it possible to simultaneously manage, in the same building station, the building of three carcass structures at least partially in parallel.

Specifically, the robotic arm 24, 24' transfers the forming support A, A' to the assembly apparatus 51, 51' where it leaves it for the time in which a carcass ply is assembled.

During the assembly time of the carcass ply, the robotic arm 24, 24' is free to carry out further operations including, for example:

picking up from the waiting unit 14', 14'a arranged upstream of the workstations 17, 17' a further forming support carrying a tyre being processed to bring it inside the workstation 17, 17', depositing it at an inner waiting unit 25a,25b, 25a',25b';

picking up from another inner waiting unit 25a,25b, 25a',25b' a forming support carrying a tyre being processed at which at least one carcass ply has already been assembled, bringing it to the filling insert application device 54, 54' and supporting such a tyre being processed during the application of the filling insert;

bringing a forming support carrying a tyre being processed to which the filling insert has been applied back to an inner waiting unit 25a,25b, 25a',25b';

depositing a forming support carrying a tyre being processed whose carcass structure has been finished, at the first transfer unit 41 or at the third waiting unit 14", respectively.

Moreover, between the assembly of a carcass ply of a first tyre and a carcass ply of a second tyre, the robotic arm 24, 24' can pick up the forming support A, A' carrying a first tyre being processed on which the assembly of the carcass ply by the corresponding assembly apparatus 51, 51' has ended, to temporarily deposit it in an inner waiting unit 25a,25b, 25a',25b', and pick up from the other inner waiting unit 25a,25b, 25a',25b' a second forming support A, A' carrying a second tyre that must be subjected to the assembly of a carcass ply, to bring it to such an assembly apparatus 51, 51'.

At the end of the building of the first and of the second carcass structure, respectively, the corresponding forming support A, A' is transferred to a workstation in which the building of at least one further structural component of the respective model of green tyre is carried out.

Such a workstation is arranged downstream of the second workstation 17' for building a second carcass structure.

Specifically, in the plant shown in FIG. 1, the workstation arranged downstream of the second workstation 17' to which the forming supports coming out from the workstations 17, 17' are transferred is the workstation 18 for building a belt structure.

The transfer of the forming support A coming out from the workstation 17 to the workstation 18 takes place without transiting through the workstation 17'.

For this purpose, the forming support A is delivered to a by-pass device 40, that is, in the specific plant shown in FIG. 1, the robotic arm 24 of the workstation 17 places the forming support A at the first transfer position 41.

From such a transfer position 41 the by-pass device 40 picks up the forming support A to transport it to the second transfer position 42 arranged near to the workstation 18 for building a belt structure, where such a forming support A can be picked up by the robotic arm 26 associated with such a workstation 18 to proceed with the building of the further structural components of the tyre.

The transfer of the forming support A' coming out from the second workstation 17' to the workstation 18 for building a belt structure, on the other hand, provides for the robotic arm 24' of the workstation 17' to deposit the forming support A' in the waiting unit 14" arranged close to the workstation 18, from which it can subsequently be picked up by the robotic arm 26 associated with such a workstation 18 to proceed with the building of the further structural components of the tyre.

The Applicant finally observed that in the case of malfunctioning of the workstation 17, for example of the robotic arm 24 and/or of the assembly apparatus 51, the production can proceed due to the workstation 17' that, through the robotic arm 24', will arrange each tyre being processed on its own forming support in the waiting unit 14" once the carcass structure has been finished. Thereafter, the robotic arm 26, as described above, will allow each tyre being processed to proceed with the building thereof.

Similarly, in the case of malfunctioning of the workstation 17', for example of the robotic arm 24' and/or of the assembly apparatus 51', the production can proceed due to the workstation 17 that, through the robotic arm 24, will arrange each tyre being processed on its own forming support in the transfer position 41 once the carcass structure has been finished. The by-pass device 40 will then bring each tyre to the transfer position 42. Thereafter, the robotic arm 26, as described above, will allow each tyre being processed to proceed with the building thereof.

The operative reliability of the plant according to the invention is thus remarkably increased.

The invention claimed is:

1. A plant for building different models of green tyres for vehicle wheels by using elementary semi-finished products, comprising:
at least one first workstation for building a first carcass structure on a first forming support, said at least one first workstation comprising:
a first assembly apparatus configured for assembling said first carcass structure, wherein said first assembly apparatus comprises a first feeding unit configured for feeding a first elementary semi-finished product onto said first forming support,
a first application unit configured for applying annular reinforcing inserts on said first forming support, and
a first filling insert application device configured for applying at least one first filling insert on said first forming support;
two inner waiting units positioned inside said at least one first workstation and configured for temporarily storing said first forming support;
said at least one first workstation further comprising a first transportation device configured for transporting said first forming support from one of the two inner waiting units to said first filling insert application device and for transporting said first forming support from said first filling insert application device back to said one of the two said inner waiting units, and for transporting said first forming support from said first assembly apparatus to the first filling insert application device and for transporting said first forming support back to said first assembly apparatus from the first filling insert application device,
at least one second workstation arranged in a production path downstream of said at least one first workstation for building at least one second carcass structure on at least one second forming support, said at least one second workstation comprising:
at least one second assembly apparatus configured for assembling said at least one second carcass structure, wherein said at least one second assembly apparatus comprises at least one second feeding unit configured for feeding a second elementary semi-finished product,
wherein the second elementary semi-finished product is different from said first elementary semi-finished product including different elastomeric material used to make the first elementary semi-finished product and/or a different type of reinforcing elements inside the elastomeric material, onto said at least one second forming support; and
at least one bypass device for transporting said first forming support from said at least one first workstation to a third workstation arranged in the production path downstream said at least one second workstation for building at least one further structural component, without transiting through said at least one second workstation,
wherein said at least one first workstation and said at least one second workstation are synchronised with each other so that said first carcass structure and said at least one second carcass structure are built at least in part simultaneously.

2. The plant according to claim 1, wherein said at least one second workstation further comprises:
- at least one second application unit configured for applying annular reinforcing inserts on said at least one second forming support; at least one second filling insert application device configured for applying at least one second filling insert on said least one second forming support; and
- at least one second transportation device configured for transporting said at least one second forming support from said at least one second assembly apparatus to said at least one second filling insert application device and for transporting said at least one second forming support back to said at least one second assembly apparatus from said at least one second filling insert application device.

3. The plant according to claim 2, wherein said third workstation is configured to build, on each of said first carcass structure and at least one second carcass structure, a belt structure of a respective model of tyre.

4. The plant according to claim 3, wherein said at least one bypass device is a translator carriage.

5. The plant according to claim 3, wherein said at least one bypass device is an anthropomorphic robotic arm.

6. The plant according to claim 1, comprising a further waiting unit arranged upstream of said at least one first workstation.

7. The plant according to claim 1, wherein said at least one second workstation comprises at least one second waiting unit for temporarily storing said at least one second forming support.

8. The plant according to claim 7, wherein said at least one second workstation comprises two second waiting units.

9. The plant according to claim 7, comprising at least one further waiting unit arranged upstream of said at least one second workstation.

10. The plant according to claim 8, wherein said first transportation device comprises an anthropomorphic robotic arms.

11. The plant according to claim 10, wherein said first forming support and at least one second forming support are toroidal in shape.

12. The plant according to claim 11, comprising a further transportation device configured for transporting said first forming support and at least one second forming support towards said at least one first workstation and said at least one second workstation, respectively.

13. The plant according to claim 1, comprising at least one waiting unit configured for receiving said at least one second forming support carrying said at least one second carcass structure from a transportation device of said at least one second workstation and for allowing the transportation of said at least one second forming support towards said third workstation through a transportation device associated therewith.

14. The plant according to claim 13, wherein said first assembly apparatus and at least one second assembly apparatus build, through said first feeding unit and said at least one second feeding unit, respectively, each carcass ply belonging to said first carcass structure and said at least one second carcass structure, respectively, by arranging close to each other side-by-side a plurality of axially adjacent strip-like elements at the longer side thereof, respectively.

15. The plant according to claim 1, wherein said at least one bypass device comprises a first transfer position in the production path downstream said at least one first workstation and a second transfer position in the production path downstream said at least one second workstation.

* * * * *